(12) United States Patent
Wu et al.

(10) Patent No.: US 12,372,852 B2
(45) Date of Patent: *Jul. 29, 2025

(54) CAMERA DEVICE WITH IMAGE COMPENSATION AND AUTOFOCUS FUNCTION

(71) Applicant: Lanto Electronic Limited, Kunshan (CN)

(72) Inventors: Fu-Yuan Wu, Taipei (TW); Tao-Chun Chen, Taipei (TW); Wen-Yen Huang, Taipei (TW); Meng-Ting Lin, Taipei (TW); Shang-Yu Hsu, Taipei (TW)

(73) Assignee: LANTO ELECTRONIC LIMITED, Kunshan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/768,982

(22) Filed: Jul. 10, 2024

(65) Prior Publication Data

US 2024/0369910 A1    Nov. 7, 2024

Related U.S. Application Data

(63) Continuation of application No. 17/581,129, filed on Jan. 21, 2022, now Pat. No. 12,061,410.

(30) Foreign Application Priority Data

May 20, 2021 (CN) .......................... 202110550462.0

(51) Int. Cl.
*G03B 13/36* (2021.01)
*G02B 7/28* (2021.01)
*H04N 23/67* (2023.01)

(52) U.S. Cl.
CPC .............. *G03B 13/36* (2013.01); *G02B 7/28* (2013.01); *H04N 23/67* (2023.01)

(58) Field of Classification Search
CPC .. G03B 13/36; G03B 2205/0015; G03B 5/00; G03B 30/00; G03B 3/10; G02B 7/28;
(Continued)

(56) References Cited

U.S. PATENT DOCUMENTS 11,366,333 B2 * 6/2022 Fujisaki ................ G03B 17/17
2008/0187301 A1    8/2008 Takahashi
(Continued)

FOREIGN PATENT DOCUMENTS

CN    204761268 U    11/2015
CN    105573014 A    5/2016
(Continued)

*Primary Examiner* — Timothy R Newlin
(74) *Attorney, Agent, or Firm* — Birch, Stewart, Kolasch & Birch, LLP

(57) ABSTRACT

A camera device with image compensation and autofocus function, comprising a first carrying member, a second carrying member, a camera module, a first optical compensation component, a third carrying member, and an autofocus component. The second carrying member is movably assembled to the first carrying member. The first optical compensation component comprises a first force interaction member disposed at the first carrying member and a second force interaction member disposed at the second carrying member, which generate force interaction, allowing the second carrying member to move in the direction of a first axis or/and a second axis intersecting with an optical axis of the optical lens for optical compensation for the optical lens. The third carrying member bears the optical lens and is movably disposed on the second carrying member. The third carrying member could move along an optical axis of the optical lens.

14 Claims, 12 Drawing Sheets

(58) Field of Classification Search
CPC . G02B 7/026; G02B 7/08; G02B 7/09; H04N 23/67; H04N 23/55; H04N 23/57; H04N 23/687; H04N 23/54; H04N 23/68
See application file for complete search history.

(56) References Cited

U.S. PATENT DOCUMENTS

| | | | | |
|---|---|---|---|---|
| 2014/0160311 | A1* | 6/2014 | Hwang | G02B 27/646 348/208.99 |
| 2015/0049209 | A1* | 2/2015 | Hwang | G02B 7/09 348/208.11 |
| 2015/0160426 | A1* | 6/2015 | Chao | H02K 41/0356 359/824 |
| 2015/0358528 | A1* | 12/2015 | Brodie | G03B 3/10 348/345 |
| 2016/0202446 | A1* | 7/2016 | Cheng | H02K 41/0354 359/557 |
| 2019/0141248 | A1* | 5/2019 | Hubert | H05K 1/189 |
| 2020/0344417 | A1 | 10/2020 | Xu et al. | |
| 2021/0109421 | A1 | 4/2021 | Yu | |
| 2021/0165237 | A1* | 6/2021 | Kimura | H04N 13/239 |
| 2021/0208417 | A1* | 7/2021 | Choi | H04N 23/687 |
| 2021/0278692 | A1 | 9/2021 | Kasahara et al. | |
| 2022/0182514 | A1 | 6/2022 | Shen et al. | |
| 2022/0279093 | A1 | 9/2022 | Kwon et al. | |
| 2022/0373865 | A1 | 11/2022 | Wu et al. | |

FOREIGN PATENT DOCUMENTS

| | | |
|---|---|---|
| CN | 105785549 A | 7/2016 |
| CN | 107219605 A | 9/2017 |
| CN | 207424398 U | 5/2018 |
| CN | 108169869 A | 6/2018 |
| CN | 207718060 U | 8/2018 |
| CN | 208143351 U | 11/2018 |
| CN | 110780509 A | 2/2020 |
| CN | 210431574 U | 4/2020 |
| CN | 111812911 A | 10/2020 |
| CN | 112822363 A | 5/2021 |
| TW | I615651 B | 2/2018 |
| TW | M560024 U | 5/2018 |
| WO | WO 2015/147385 A1 | 10/2015 |

* cited by examiner

CAMERA DEVICE WITH IMAGE COMPENSATION AND AUTOFOCUS FUNCTION

CROSS-REFERENCE TO RELATED APPLICATION

This application is a continuation application of U.S. patent application Ser. No. 17/581,129, filed on Jan. 21, 2022, which claims the priority benefit of Chinese Patent Application Serial Number 202110550462.0, filed on May 20, 2021, the full disclosure of which is incorporated herein by reference.

BACKGROUND

Technical Field

The present disclosure relates to the technical field of image compensation and autofocus of camera devices, particularly to a camera device with image compensation and autofocus function, whose image compensation mechanism and autofocus mechanism are sharing common components.

Related Art

Conventional camera devices are capable of autofocus function. Optical lens of a camera is driven to move along the optical axis to focus for clear image through autofocus mechanism. Image stabilization mechanism is also applied to cameras for compensating handshakes for excellent image quality while holding camera. Since the autofocus and the optical image stabilization are independent mechanisms, a certain amounts of parts and components needs to be installed in a camera in a complex way. Thus, it can be seen that the size of cameras having great functions generally could not be miniaturized.

SUMMARY

The embodiments of the present disclosure provide a camera device with image compensation and autofocus function tended to solve the problem that a large number of parts installed forming a complex configuration in camera since autofocus mechanism and image stabilization mechanism are independently installed, which makes the camera device unable to be miniaturized.

The present disclosure provides a camera device with image compensation and autofocus function, comprising a first carrying member, a second carrying member, a camera module, a first optical compensation component, a third carrying member, and an autofocus component. The second carrying member is movably assembled to the first carrying member. The second carrying member comprises a first supporting part and a second supporting part. The camera module comprises an optical lens and an image sensor. The first optical compensation component comprises a first force interaction member disposed at the first carrying member and a second force interaction member disposed at the second carrying member. The first force interaction member and the second force interaction member are configured to generate force interaction, allowing the second carrying member to move relative to the first carrying member for optical compensation for the optical lens. The third carrying member bears the optical lens and is movably disposed on the second carrying member. The autofocus component comprises a focusing force interaction member and is disposed on the third carrying member. The focusing force interaction member and the second force interaction member are configured to generate force interaction, allowing the third carrying member to move along an optical axis of the optical lens. The second carrying member is configured to swing around a first axis orthogonal to the optical axis of the optical lens by the first supporting part, and the second carrying member is configured to swing around a second axis orthogonal to the optical axis of the optical lens by the second supporting part. The first axis is orthogonal to the second axis.

In the embodiments of the present disclosure, through the force interaction between the first force interaction member on the first carrying member and the second force interaction member on the second carrying member, the second carrying member could move along the first axis or/and the second axis to optically compensate for the optical lens, and meanwhile, the focusing force interaction member is force interacted with the second force interaction member to allow the third carrying member to move along the optical axis of the optical lens to perform autofocus. The first optical compensation component and the autofocus component could share the second force interaction member to perform image compensation and autofocus. Thus, the number of components installed in the camera device can be limited and the configuration of the camera device can be simplified to realize the miniaturization of the camera device.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
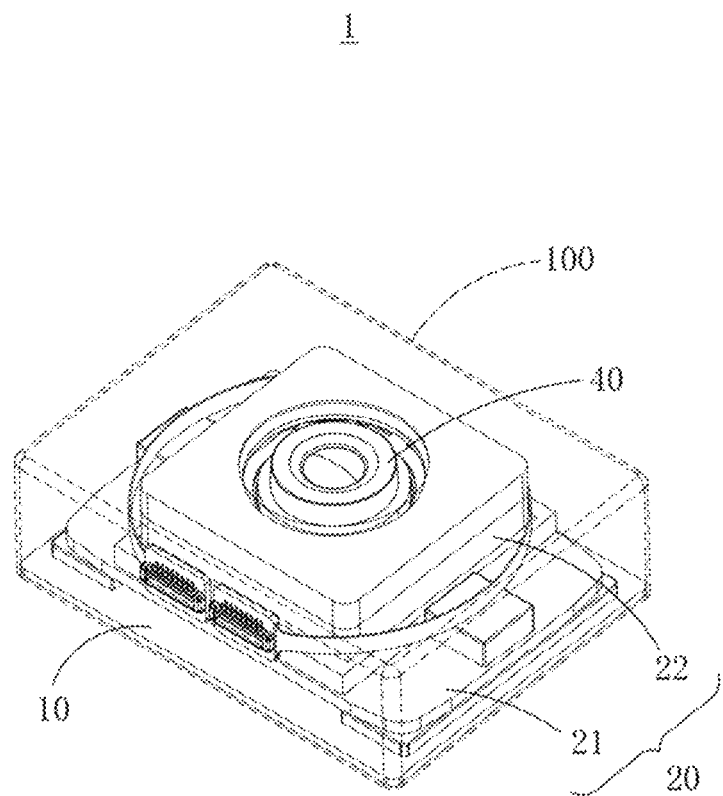
FIG. 1 is a perspective view of a camera device with image compensation and autofocus function of an embodiment of the present disclosure.
Figure 2:
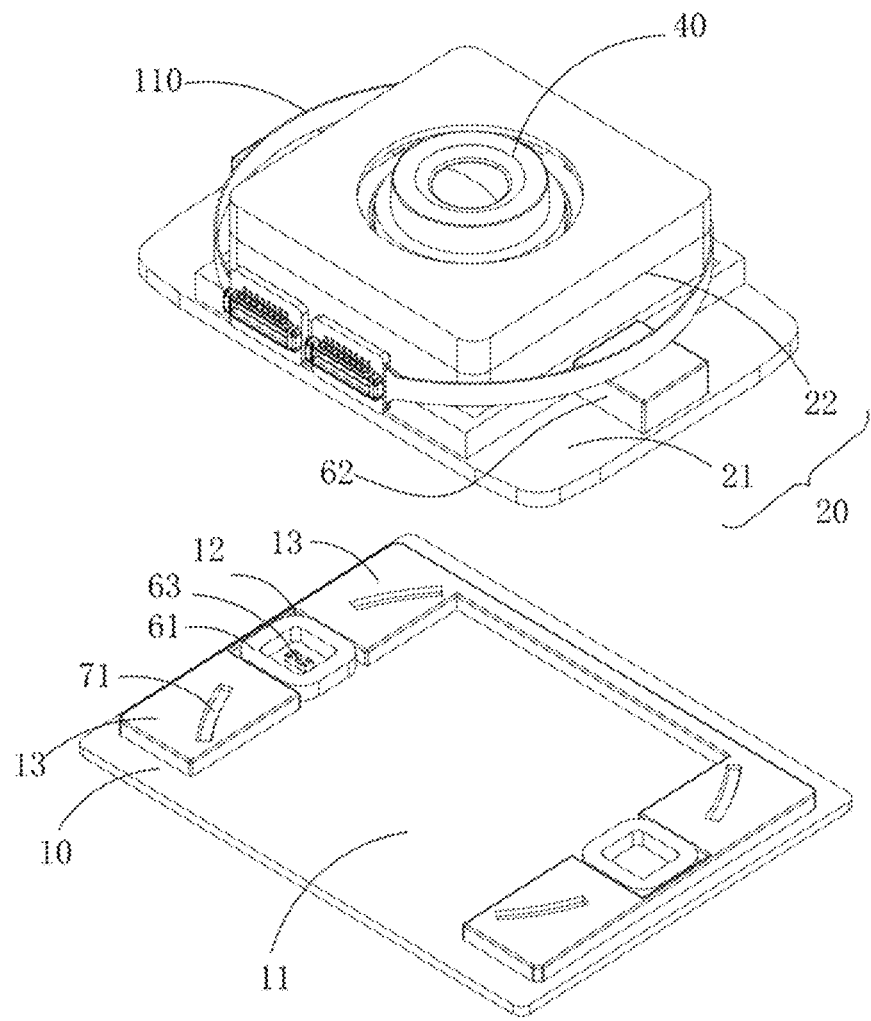
FIG. 2 is a partially exploded view of the camera device with image compensation and autofocus function of FIG. 1.
Figure 3:
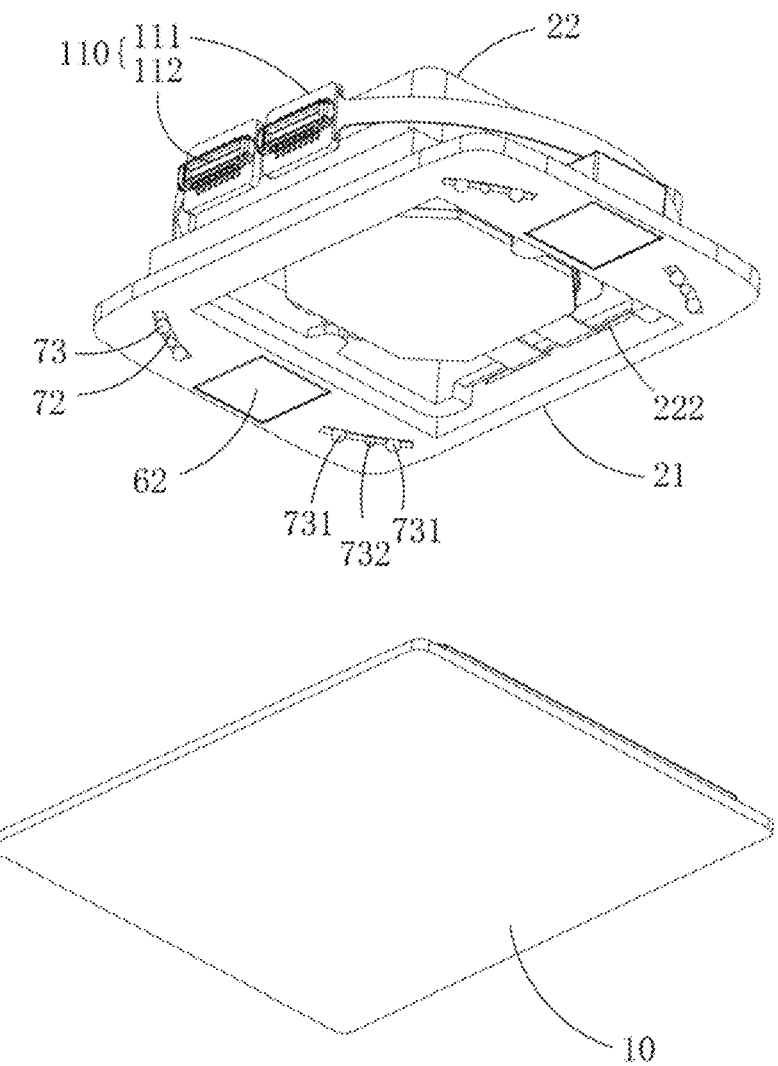
FIG. 3 is another partially exploded view of the camera device with image compensation and autofocus function of FIG. 1.
Figure 4:
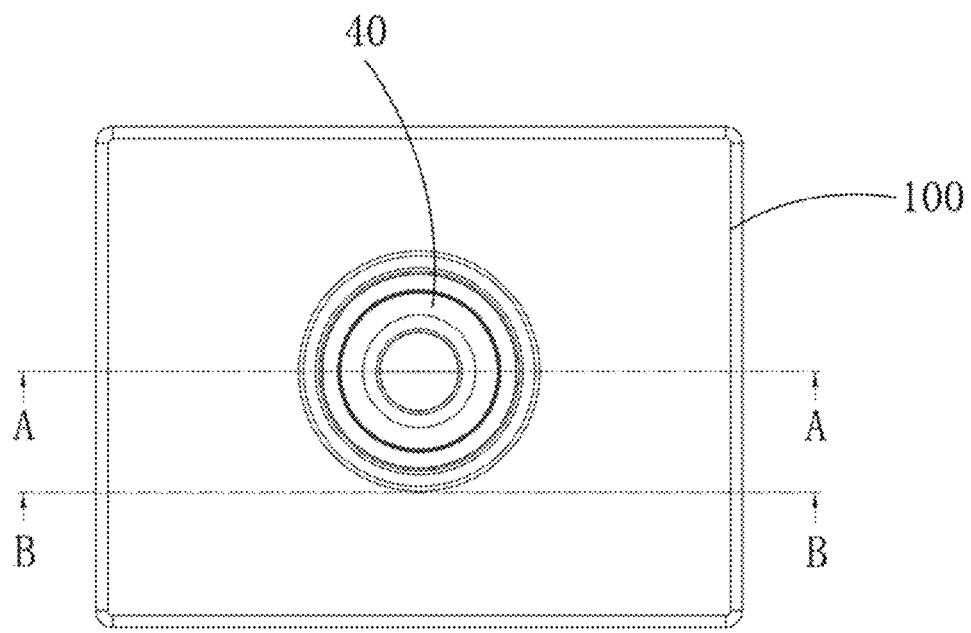
FIG. 4 is a top view of the camera device with image compensation and autofocus function of FIG. 1.
Figure 5:
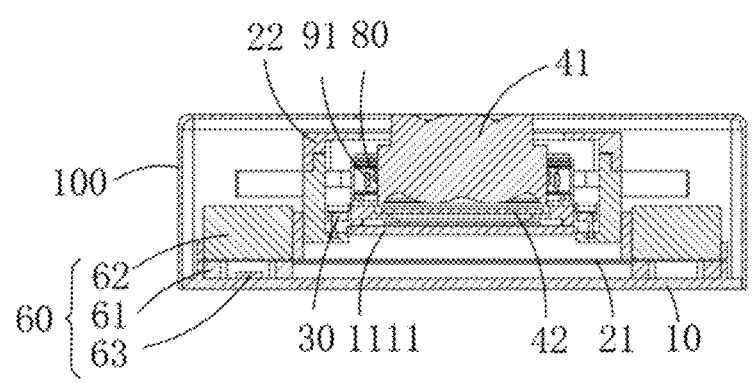
FIG. 5 is a cross-sectional view along line A-A of FIG. 4.
Figure 6:
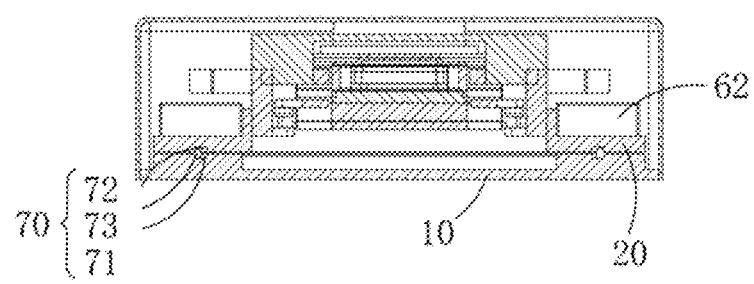
FIG. 6 is a cross-sectional view along line B-B of FIG. 4.

FIG. 1 is a perspective view of a camera device with image compensation and autofocus function of an embodiment of the present disclosure. FIG. 2 is a partially exploded view of the camera device with image compensation and autofocus function of FIG. 1. FIG. 3 is another partially exploded view of the camera device with image compensation and autofocus function of FIG. 1. FIG. 4 is a top view of the camera device with image compensation and autofocus function of FIG. 1. FIG. 5 is a cross-sectional view along line A-A of FIG. 4. FIG. 6 is a cross-sectional view along line B-B of FIG. 4. As shown in the figures, in this embodiment, a camera device with image compensation and autofocus function 1 is provided, which comprises a base 10, a first carrying member 20, a second carrying member 30, a camera module 40, a first optical compensation component 50, a second optical compensation component 60, and a guiding component 70. The camera device with image compensation and autofocus function 1 further comprises a third carrying member 80 and an autofocus component 90.

In this embodiment, the first optical compensation component 50 could linearly move the camera module 40 on a first axis and/or a second axis intersecting an optical axis of the camera module 40 to perform four-axis optical compensation for the camera module 40. The second optical compensation component 60 and the guiding component 70 could rotate the camera module 40 around a third axis parallel to the optical axis of the camera module 40 to perform fifth-axis optical compensation for the camera module 40. The following describes the configuration and effects for each component.

Referring to FIG. 2, FIG. 3, FIG. 5, and FIG. 6, the camera module 40 and the second carrying member 30 carrying the camera module 40 are disposed on the first carrying member 20. The guiding component 70 is disposed between the first carrying member 20 and the base 10. The second optical compensation assembly 60 is disposed on the base 10 and the first carrying member 20. The second optical compensation assembly 60 drives the first carrying member 20 to rotate about a third axis L3 parallel to the camera module 40 on the base 10 through the guiding component 70. As shown in FIG. 5, the camera module 40 comprises an optical lens 41 and an image sensor 42 on the second carrying member 30. External light is imaged on the image sensor 42 through the optical lens 41 and is converted into an image signal.

Figure 7:
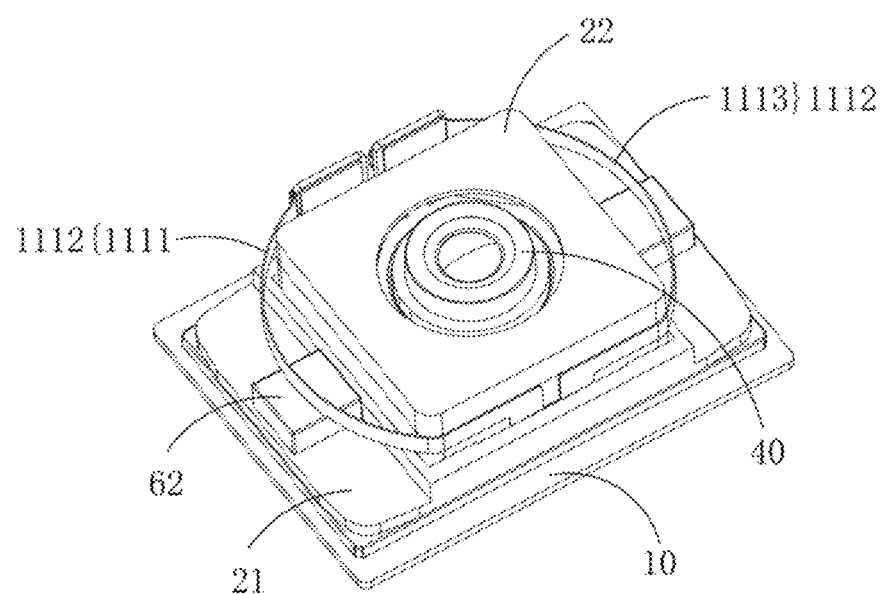
FIG. 7 is a perspective view of the camera device with image compensation and autofocus function of FIG. 1 with a base and a housing removed.
Figure 8:
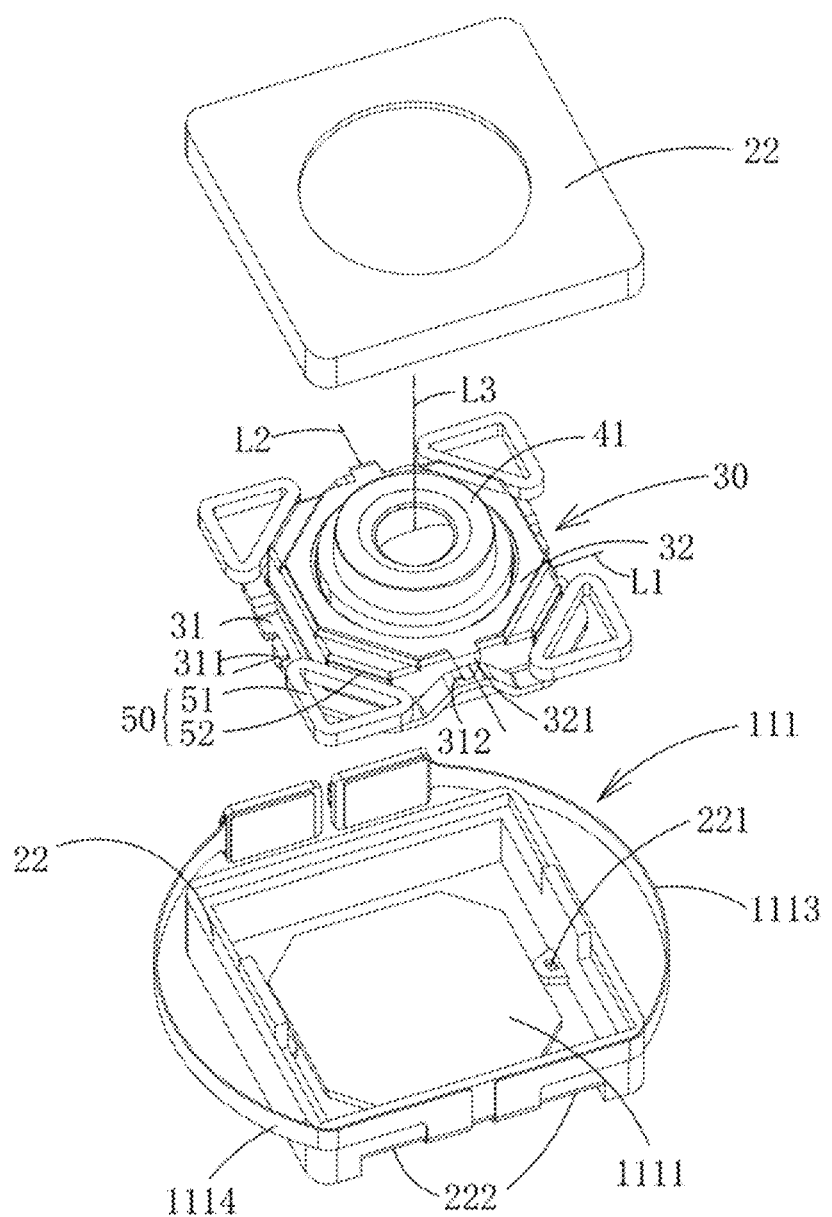
FIG. 8 is a partially exploded view of FIG. 7.
Figure 9:
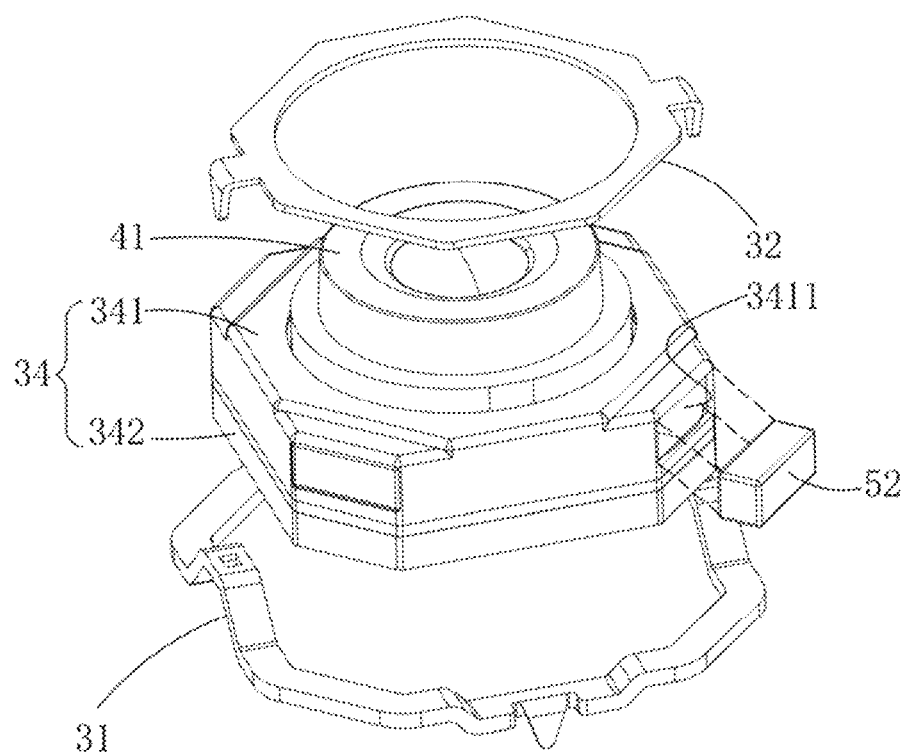
FIG. 9 is a perspective view of the camera device with image compensation and autofocus function of FIG. 7 with a frame body and a flexible circuit board removed.
Figure 10:
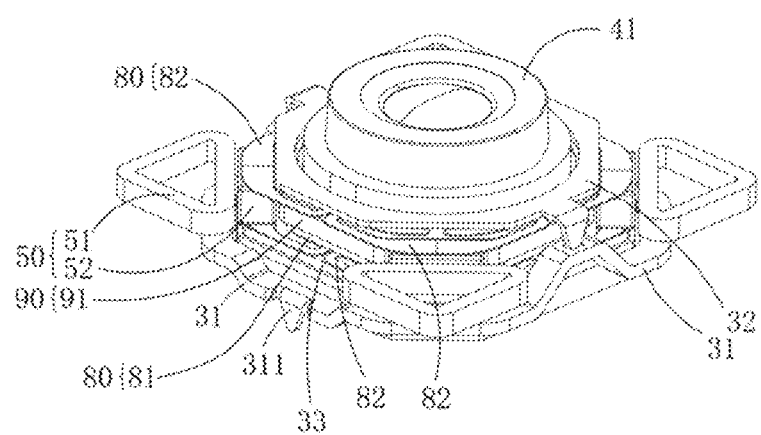
FIG. 10 is a perspective view of the camera device with image compensation and autofocus function of FIG. 9 with a camera module carrying base removed.
Figure 11:
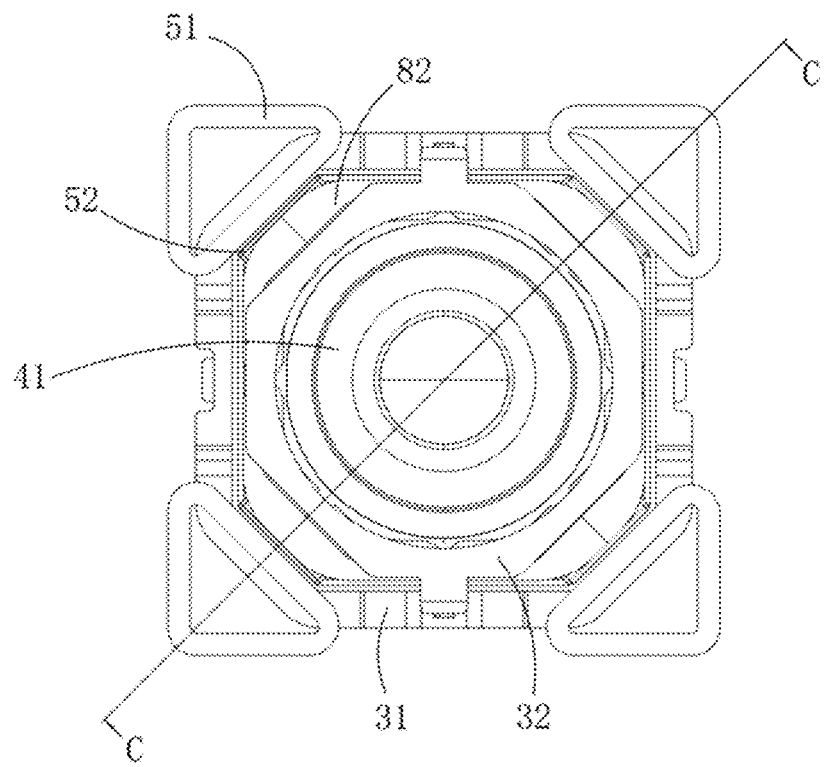
FIG. 11 is a top view of FIG. 10.
Figure 12:
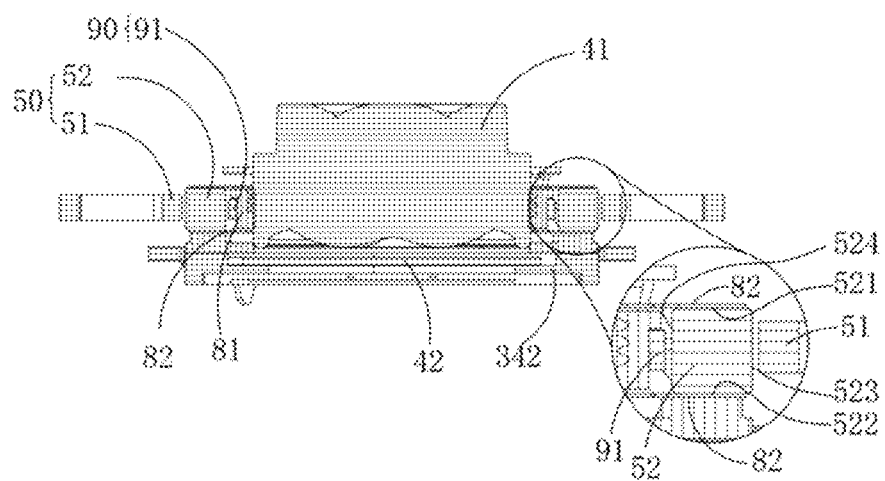
FIG. 12 is a cross-sectional view along line C-C of FIG. 11.

FIG. 7 is a perspective view of the camera device with image compensation and autofocus function of FIG. 1 with a base and a housing removed. FIG. 8 is a partially exploded view of FIG. 7. FIG. 9 is a perspective view of the camera device with image compensation and autofocus function of FIG. 7 with a frame body and a flexible circuit board removed. FIG. 10 is a perspective view of the camera device with image compensation and autofocus function of FIG. 9 with a camera module carrying base removed. FIG. 11 is a top view of FIG. 10. FIG. 12 is a cross-sectional view along line C-C of FIG. 11. As shown in the figures, the optical lens 41 of the camera module 40 is disposed on the third carrying member 80, and the first carrying member 20 comprises a first carrying member body 21 and a frame body 22 disposed on the first carrying member body 21. The second carrying member 30 is disposed in the frame body 22, which surrounds the second carrying member 30, the third carrying member 80, and the camera module 40. As shown in FIG. 8 and FIG. 9, the second carrying member 30 comprises a lower carrying body 31 swingably disposed at the first carrying member 20 around a first axis L1, an upper carrying body 32 swingably disposed at the lower carrying body 31 around a second axis L2, and a camera module carrying base 34 secured to the upper carrying body 32. The third carrying member 80 is movably disposed in the camera module carrying base 34. The frame body 22 comprises two opposite first installation grooves 221, in which two first supporting parts 311 of the lower carrying body 31 are inserted to realize a structural configuration of the lower carrying body 31 and the upper carrying body 32 swinging about the first axis L1. An upper surface of the lower carrying body 31 is also provided with two second installation grooves 312. The second installation grooves 312 and the first supporting parts 311 are alternately arranged on four side edges of the lower carrying body 31, and the two second supporting parts 321 of the upper carrying body 32 are inserted in the second installation groove 312 to realize a structural configuration of the upper carrying body 32 swinging about the second axis L2. The third carrying member 80 is disposed at the camera module carrying base 34, and the optical lens 41 disposed at the third carrying member 80 swings around the first axis L1 and the second axis L2 along with the lower carrying body 31 and the upper carrying body 32. As shown in FIG. 9, the camera module carrying base 34 comprises an upper carrying base 341 and a lower carrying base 342. The upper carrying body 32 is secured on a top side of the upper carrying base 341. The lower carrying base 342 is connected with a bottom side relative to the top side of the upper carrying base 341. The lower carrying body 31 surrounds the lower carrying base 342. The third carrying member 80 is disposed in the upper carrying base 341. The image sensor 42 is disposed in the lower carrying base 342.

Referring to FIG. 8, FIG. 10, FIG. 12, the first optical compensation component 50 comprises a first force interaction member 51 disposed at the first carrying member 20 and a second force interaction member 52 disposed at the second carrying member 30. The first force interaction member 51 and the second force interaction member 52 generate force interaction, allowing the second carrying member 30 to move along the first axis L1 or/and the second axis L2 intersecting with an optical axis of the optical lens 41 for optical compensation for the optical lens 41. In this embodiment, the first force interaction member 51 is a coil, and the second force interaction member 52 is a permanent magnet. As shown in FIG. 8, the first force interaction member 51 is disposed in the frame body 22 of the first carrying member 20, and the coil of the first force interaction member 51 is triangular so that the first force interaction member 51 can be positioned in the frame body 22 by cooperating with the four corners of the frame body 22. As shown in FIG. 9, the second force interaction member 52 is disposed at the upper carrying base 341, which comprises an opening 3411 penetrating a side surface of the upper carrying base 341. The second force interaction member 52 is disposed at the opening 3411. As shown in FIG. 10 and FIG. 11, the four second force interaction members 52 and the first force interaction members 51 are correspondingly disposed. When an electric current passes the first force interaction member 51, a magnetic field having a variety of magnetic field directions would be generated according to the direction of the electric current, which would magnetically interact with the permanent magnet of the second force interaction member 52, allowing the second force interaction member 52 to push in a direction different from the direction orthogonal to the second carrying member 30 according to the magnetic field generated by the first force interaction member 51. Through the swinging configuration of the lower carrying body 31 and the upper carrying body 32, the optical lens 41 could swing in a direction along the first axis L1 and/or the second axis L2 to realize the four-axis optical compensation.

Referring to FIG. 2 and FIG. 3 again, in this embodiment, the base 10 comprises a first bearing groove 11, a second bearing groove 12 disposed on two sides of the first bearing groove 11, a plurality of bosses 13, and a first guiding groove 71 disposed on two sides of the second bearing groove 12. The plurality of bosses 13 are surrounded to form the first bearing groove 11, and a gap exists between two adjacent bosses 13 to form the second bearing groove 12. The number of the first guiding grooves 71 is multiple, and they are respectively disposed on the plurality of bosses 13. As shown in FIG. 3, a bottom surface of the first carrying member 20 corresponding to the base 10 is provided with a second guiding groove 72 corresponding to the first guiding groove 71. As shown in FIG. 3 and FIG. 6, a plurality of spheroids 73 are disposed in the first guiding groove 71 and the second guiding groove 72. When the first carrying member 20 and the base 10 are moving in a relative manner, the spheroid 73 could be rolling in the first guiding groove 71 and the second guiding groove 72 to realize a slidable assembly between the first carrying member 20 and the base 10. Meanwhile, by rolling the spheroid 73 in the first guiding groove 71 and the second guiding groove 72, the frictional force between the first carrying member 20 and the base 10 can be reduced. So that the first guiding groove 71, the second guiding groove 72, and the spheroid 73 on the base 10 of the first carrying member 20 could form a guiding component 70. As shown in FIG. 2 and FIG. 3, the first guiding groove 71 and the second guiding groove 72 are both arc-shaped, and the centers of the first guiding groove 71 and the second guiding groove 72 are on the third axis L3 so that the first carrying member 20 is limited by the combinational configuration of the spheroid 73 with the first guiding groove 71 and the second guiding groove 72 to rotate about the third axis L3. The spheroid 73 comprises two first spheroids 731 and a second spheroid 732 between the two first spheroids 731. The first spheroid 731 is in contact with the first guiding groove 71 and the second guiding groove 72, and the diameter of the second spheroid 732 is less than the diameter of the first spheroid 731. When the two first spheroids 731 are rolling in the first guiding groove 71 and the second guiding groove 72, the second spheroid 732 between the two first spheroids 731 would prevent the two first spheroids 731 from directly contacting and getting stuck.

Referring to FIG. 2 and FIG. 3, the second optical compensation component 60 comprises a third force interaction member 61 disposed at the base 10 and a fourth force interaction member 62 disposed at the first carrying member 20. The third force interaction member 61 is disposed in the second bearing groove 12 of the base 10, and the guiding component 70 connects with the base 10 and the first carrying member 20. As shown in FIG. 2, the third force interaction member 61 is a coil, and as shown in FIG. 3, the fourth force interaction member 62 is a permanent magnet. When electric current passes the third force interaction member 61, a magnetic field having a variety of magnetic field directions would be generated according to the direction of the electric current, which would magnetically interact with the permanent magnet of the fourth force interaction member 62, allowing the fourth force interaction member 62 to push in a direction different from the direction perpendicular to the base 10 according to the magnetic field generated by the third force interaction member 61. In this way, the first carrying member 20 is guided by the guiding component 70 to move around the third axis L3 parallel to the optical axis of the camera module 40 on the base 10 to optically compensate for the optical lens 41. The second optical compensation component 60 further comprises a Hall effect sensor 63 for detecting the position of the fourth force interaction member 62.

In addition to the aforementioned magnetic interaction by the first force interaction member 51 and the second force interaction member 52 and the four-axis optical compensation through the optical lens 41 swinging in the direction of the first axis L1 and/or the second axis L2 orthogonal to the optical axis by the swinging configuration of the lower carrying body 31 and the upper carrying body 32, the fifth-axis optical compensation can be performed by magnetic interaction by the third force interaction member 61 and the fourth force interaction member 62 and the moving of the first carrying member 20 around the third axis L3 parallel to the optical axis of the camera module 40 on the base 10 guided by the guiding component 70. [0038] the first carrying member 20 is guided by the guiding component 70 to move around the third axis L3 parallel to the optical axis of the camera module 40 on the base 10

Figure 13:
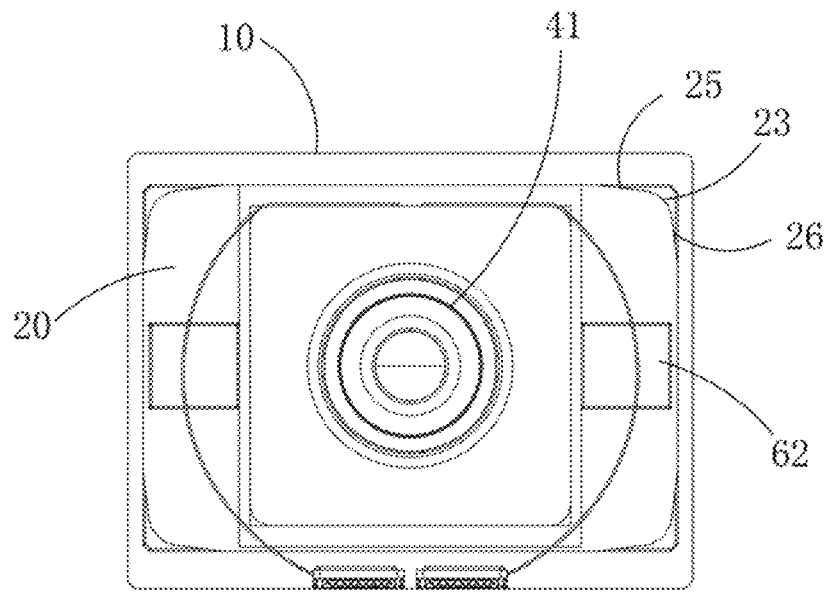
FIG. 13 is a schematic diagram showing a first carrying member of the camera device with image compensation and autofocus function and a camera module on the first carrying member are disposed on a base of FIG. 1.
Figure 14:
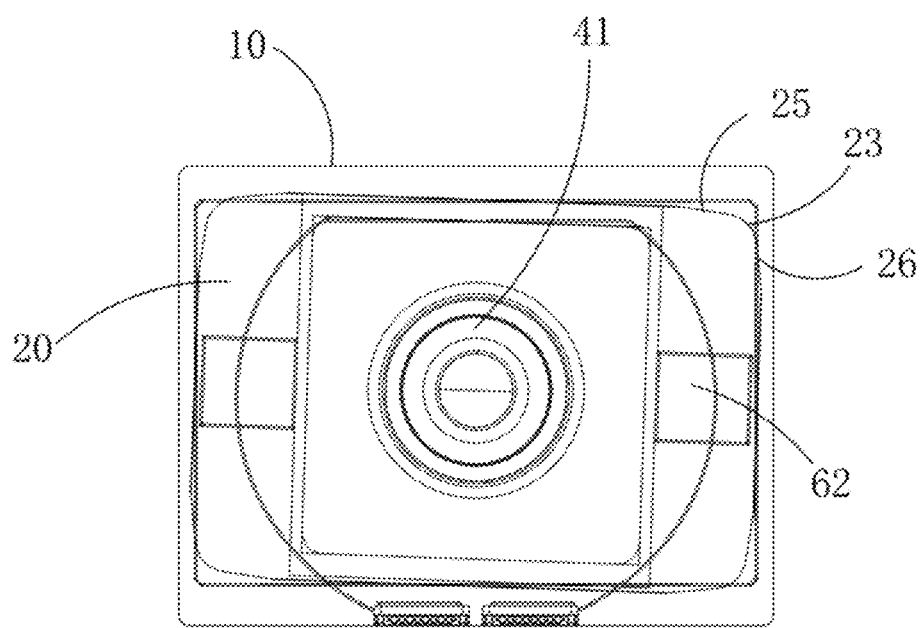
FIG. 14 is a schematic diagram showing the first carrying member and the camera module on the first carrying member of FIG. 13 rotate around a third axis in an angle of minus 5 degrees.
Figure 15:
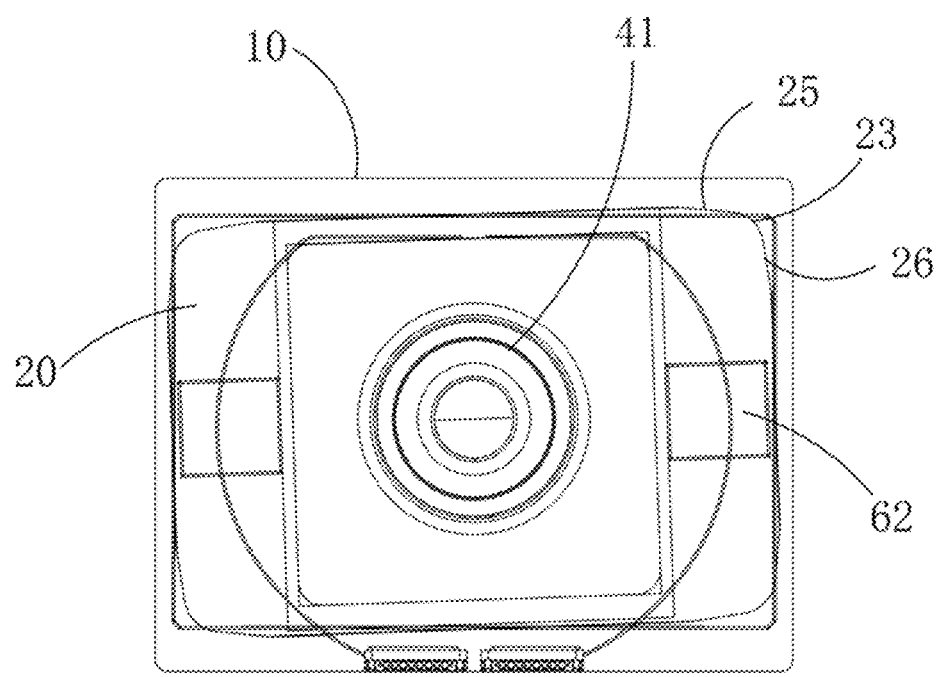
FIG. 15 is a schematic diagram showing the first carrying member and the camera module on the first carrying member of FIG. 13 rotate around the third axis in an angle of 5 degrees.

FIG. 13 is a schematic diagram showing a first carrying member of the camera device with image compensation and autofocus function and a camera module on the first carrying member are disposed on a base of FIG. 1. FIG. 14 is a schematic diagram showing the first carrying member and the camera module on the first carrying member of FIG. 13 rotate around a third axis in an angle of minus 5 degrees. FIG. 15 is a schematic diagram showing the first carrying member and the camera module on the first carrying member of FIG. 13 rotate around the third axis in an angle of 5 degrees. As shown in the figures, the first carrying member 20 rotates about the third axis L3 within a predetermined compensation angle range on the base 10. In this embodiment, the range of the angle is between 5 and minus 5 degrees. As shown in FIG. 1, a housing 100 disposed on the base 10 and surrounding the first carrying member 20 is further provided. The first carrying member 20 comprises a corner part 23. A part of two adjacent side edges 25, 26 of the first carrying member 20 forming a corner part 23 close to the corner part 23 and other parts form an inclination angle so that when the first carrying member 20 rotates within the compensation angle range, it would not interfere with the housing 100. The side edges 25, 26 of the first carrying member 20 close to the corner part 23 form a retracted configuration. In this way, when the first carrying member 20 rotates within the above-mentioned angle of ±5 degrees, the corner part 23 of the first carrying member 20 would not interfere with the housing 100.

Thus, in addition to the conventional four-axis image stabilization optical compensation, the camera device of the present disclosure realizes the fifth-axis optical compensation for comprehensive five-axis image stabilization.

Referring to FIG. 10 and FIG. 12 again, the autofocus component 90 comprises a focusing force interaction member 91 disposed at the third carrying member 80. The third carrying member 80 comprises a third carrying member body 81 and an elastic support member 82. The optical lens 41 is disposed at the third carrying member body 81. In this embodiment, the third carrying member body 81 is cylindrical, and the optical lens 41 is screwed on an inner peripheral surface of the third carrying member body 81. The elastic support member 82 is in connect with the third carrying member body 81 and the second force interaction member 52, and the third carrying member 80 could move relative to the second force interaction member 52. In this embodiment, the focusing force interaction member 91 is a coil, which is surroundingly disposed at the third carrying member body 81. The coil of the focusing force interaction member 91 surrounds an outer peripheral surface of the cylindrical third carrying member body 81. The focusing force interaction member 91 and the first force interaction member 51 are disposed on two opposite sides of the second force interaction member 52. As shown in FIG. 12, the second force interaction member 52 comprises an upper side 521 and a lower side 522 oppositely arranged on the optical axis and a left side 523 and a right side 524 oppositely arranged on an axis perpendicular to the optical axis. The first force interaction member 51 and the focusing force interaction member 91 respectively correspond to the left side 523 and right side 524 of the second force interaction member 52.

As shown in FIG. 10, in this embodiment, the number of the elastic support members 82 is at least two. The two elastic support members 82 are respectively connected with two opposite sides of the third carrying member body 81 and two opposite sides of the second force interaction member 52 and are disposed at two opposite sides of the focusing force interaction member 91. The two elastic support members 82 are respectively connected with the upper side 521 and lower side 522 of the second force interaction member 52. The second force interaction member 52 is sandwiched between two elastic support members 82, and the lower elastic support member 82 is connected with a supporting plate 33 carrying the second force interaction member 52. When an image imaged on the image sensor 42 is blurred and autofocus is required, an electric current would pass the focusing force interaction member 91, then the focusing force interaction member 91 would generate a magnetic field in different magnetic force directions according to the current direction, and magnetically interacts with the permanent magnet of the second force interaction member 52. In this way, the focusing force interaction member 91 and the third carrying member body 81 would move back and forth along the direction of the optical axis of the optical lens 41 for autofocus.

Thus, the first optical compensation component 50 and the autofocus component 90 could be sharing the second force interaction member 52, thereby reducing the number of parts installed and downsizing the compensation and autofocus mechanism for the miniaturization of the camera device, which can be adaptive to modern lightweight and thinned mobile devices.

Figure 16:
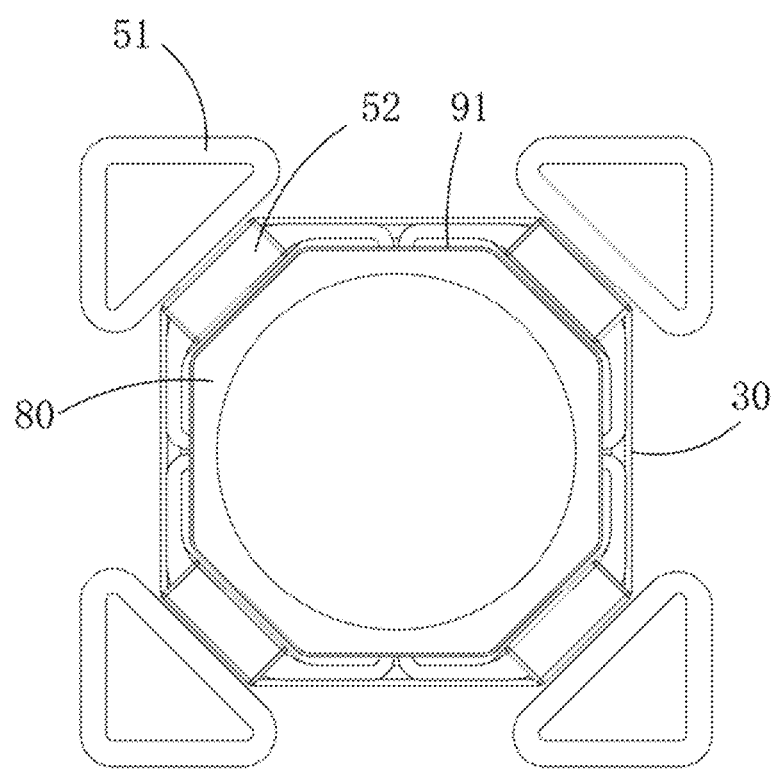
FIG. 16 is a top view of a configuration of a first optical compensation component and an auto focus component of the first embodiment of the present disclosure.
Figure 17:
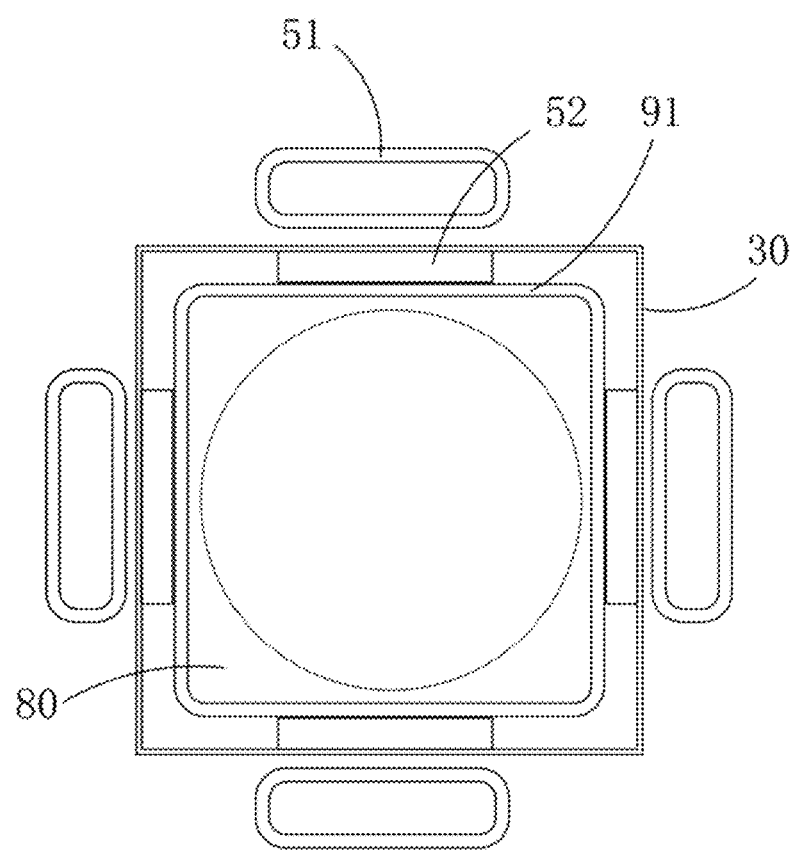
FIG. 17 is a top view of a configuration of a first optical compensation component and an auto focus component of the second embodiment of the present disclosure.

FIG. 16 and FIG. 17 are top views of a configuration of a first optical compensation component and an autofocus component of the first embodiment and the second embodiment of the present disclosure. As shown in the figures, the shape and configuration of the first force interaction member 51 and the second force interaction member 52 of the first optical compensation component 50 could be different. As shown in FIG. 15, the first force interaction member 51 and the second force interaction member 52 are disposed at the four diagonal corners of the first carrying member 20 and the second carrying member 30, and the focusing force interaction member 91 is octagonal-shaped and is surrounding the third carrying member 80. As shown in FIG. 15, the first force interaction member 51 and the second force interaction member 52 are disposed on four side edges of the first carrying member 20 and the second carrying member 30, and the focusing force interaction member 91 is square-shaped and is surrounding the third carrying member 80.

Therefore, it is necessary to control the direction of electric current of each coil to realize the interaction between the first force interaction member 51 and the second force interaction member 52, the interaction between the third force interaction member 61 and the fourth force interaction member 62, and the interaction between the focusing force interaction member 91 and the second force interaction member 52. As shown in FIG. 7 and FIG. 8, a circuit module 110 is further provided, which connects with external electronic devices and camera devices. Control signals and power supply of external electronic devices can control the current direction of each coil through the circuit module 110 to for performing compensation and autofocus. The circuit module 110 surrounds the frame body 22 of the first carrying member 20. The circuit module 110 comprises a flexible circuit board 111 and an electrical connector 112 disposed on the flexible circuit board 111 (shown in FIG. 2). As shown in FIG. 8, the flexible circuit board 111 comprises a bottom plate part 1111 disposed on the second carrying member 30 and a surrounding part 1112 connected with the bottom plate part 1111 and surrounding the frame body 22. The bottom plate part 1111 is disposed in the second carrying member 30 and is electrically connected with the image sensor 42. The electrical connector 112 is disposed at the surrounding part 1112. The surrounding part 1112 comprises a first surrounding body 1113 and a second surrounding body 1114 respectively connected with the bottom plate part 1111. The first surrounding body 1113 and the second surrounding body 1114 extend in opposite directions around the frame body 22. A rear sidewall of the frame body 22 away from the electrical connector 112 is provided with a through groove 222. The first surrounding body 1113 and the second surrounding body 1114 vertically extend from the through groove 222 at the rear side of the frame body 22 and horizontally surround the frame body 22 without touching the frame body 22. The number of the electrical connector 112 is two. The two electrical connectors 112 are respectively disposed at one end of the first surrounding body 1113 away from the bottom plate part 1111 and at one end of the second surrounding body 1114 away from the bottom plate part 1111.

In summary, embodiments of the present disclosure provide a camera device with image compensation and autofocus function. Through the force interaction between the first force interaction member on the first carrying member and the second force interaction member on the second carrying member, the second carrying member could move along the first axis or/and the second axis to optically compensate for the optical lens, and meanwhile, the focusing force interaction member is force interacted with the second force interaction member to allow the third carrying member to move along the optical axis of the optical lens to perform autofocus. The first optical compensation component and the autofocus component could share the second force interaction member to perform image compensation and autofocus. Thus, the number of components installed in the camera device can be limited and the configuration of the camera device can be simplified to realize the miniaturization of the camera device.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A camera device with image compensation and autofocus function, comprising:
    a first carrying member;
    a second carrying member movably assembled to the first carrying member, the second carrying member comprising a first supporting part and a second supporting part;
    a camera module comprising an optical lens and an image sensor;
    a first optical compensation component comprising a first force interaction member disposed at the first carrying member and a second force interaction member disposed at the second carrying member, the first force interaction member and the second force interaction member being configured to generate force interaction, allowing the second carrying member to move relative to the first carrying member for optical compensation for the optical lens;
    a third carrying member bearing the optical lens and being movably disposed on the second carrying member; and
    an autofocus component comprising a focusing force interaction member and being disposed on the third carrying member, the focusing force interaction member and the second force interaction member being configured to generate force interaction, allowing the third carrying member to move along an optical axis of the optical lens;
    wherein the second carrying member is configured to swing around a first axis orthogonal to the optical axis of the optical lens by the first supporting part, and the second carrying member is configured to swing around a second axis orthogonal to the optical axis of the optical lens by the second supporting part, and the first axis is orthogonal to the second axis.

2. The camera device with image compensation and autofocus function according to claim 1, wherein the third carrying member comprises a third carrying member body and an elastic support member; the optical lens is disposed at the third carrying member body; the elastic support member is in connect with the third carrying member body and the second force interaction member; the third carrying member is configured to move relative to the second force interaction member.

3. The camera device with image compensation and autofocus function according to claim 2, wherein the focusing force interaction member is surroundingly disposed at the third carrying member body; the number of the elastic support member is at least two; the two elastic support members are respectively connected with two opposite sides of the third carrying member body and two opposite sides of the second force interaction member; the two elastic support members are disposed at two opposite sides of the focusing force interaction member.

4. The camera device with image compensation and autofocus function according to claim 3, wherein the second force interaction member comprises an upper side and a lower side oppositely arranged on the optical axis and a left side and a right side oppositely arranged on an axis perpendicular to the optical axis; the two elastic support members are respectively connected with the upper side and the lower side of the second force interaction member; the focusing force interaction member and the first force interaction member are disposed on the left side and the right side of the second force interaction member.

5. The camera device with image compensation and autofocus function according to claim 4, wherein the second carrying member comprises a lower carrying body swingably disposed at the first carrying member around the first axis orthogonal to the optical axis of the optical lens, an upper carrying body swingably disposed at the lower carrying body around the second axis orthogonal to the optical axis of the optical lens, and a camera module carrying base secured to the upper carrying body; the second force interaction member is disposed at the camera module carrying base; the third carrying member is movably disposed in the camera module carrying base.

6. The camera device with image compensation and autofocus function according to claim 5, wherein the camera module carrying base comprises an upper carrying base and a lower carrying base; the upper carrying body is secured to a top side of the upper carrying base; the lower carrying base is connected with a bottom side relative to the top side of the upper carrying base; the lower carrying body surrounds the lower carrying base; the second force interaction member is disposed at the upper carrying base; the third carrying member is disposed in the upper carrying base; the image sensor is disposed in the lower carrying base.

7. The camera device with image compensation and autofocus function according to claim 6, wherein the upper carrying base comprises an opening passing through a side surface of the upper carrying base; the second force interaction member is disposed at the opening.

8. The camera device with image compensation and autofocus function according to claim 1, wherein the second carrying member comprises a lower carrying body swingably disposed at the first carrying member around the first axis orthogonal to the optical axis of the optical lens, an upper carrying body swingably disposed at the lower carrying body around the second axis orthogonal to the optical axis of the optical lens, and a camera module carrying base secured to the upper carrying body; the second force interaction member is disposed at the camera module carrying base; the third carrying member is movably disposed in the camera module carrying base.

9. The camera device with image compensation and autofocus function according to claim 8, wherein the camera module carrying base comprises an upper carrying base and a lower carrying base; the upper carrying body is secured to a top side of the upper carrying base; the lower carrying base is connected with a bottom side relative to the top side of the upper carrying base; the lower carrying body surrounds the lower carrying base; the second force interaction member is disposed at the upper carrying base; the third carrying member is disposed in the upper carrying base; the image sensor is disposed in the lower carrying base.

10. The camera device with image compensation and autofocus function according to claim 9, wherein the upper carrying base comprises an opening passing through a side surface of the upper carrying base; the second force interaction member is disposed at the opening.

11. The camera device with image compensation and autofocus function according to claim 1, wherein the first carrying member comprises a first carrying member body and a frame body disposed at the first carrying member body; the frame body surrounds the second carrying member, the third carrying member, and the camera module; the first force interaction member is disposed at the frame body.

12. The camera device with image compensation and autofocus function according to claim 11 comprising a circuit module comprising a flexible circuit board surrounding the frame body and an electrical connector disposed at one end of the flexible circuit board and at an outer side of the frame body, the image sensor being electrically connected with the circuit module.

13. The camera device with image compensation and autofocus function according to claim 12, wherein the flexible circuit board comprises a bottom plate part disposed in the first carrying member and a surrounding part connected to the bottom plate part and surrounding the frame body; the electrical connector is disposed at one end of the surrounding part away from the bottom plate part.

14. The camera device with image compensation and autofocus function according to claim 13, wherein the frame body comprises a through groove; the bottom plate is disposed at the frame body; the surrounding part comprises a first surrounding body and a second surrounding body respectively connected with the bottom plate part; the first surrounding body and the second surrounding body pass through the through groove and extend around the frame body in opposite directions.

\* \* \* \* \*